UNITED STATES PATENT OFFICE.

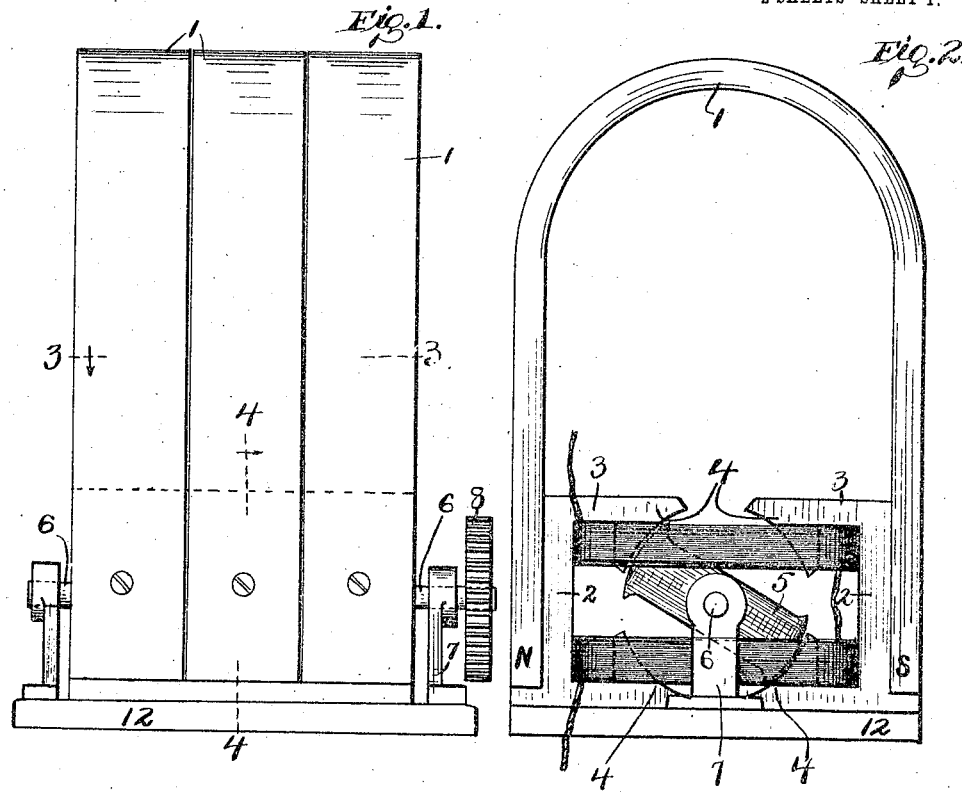
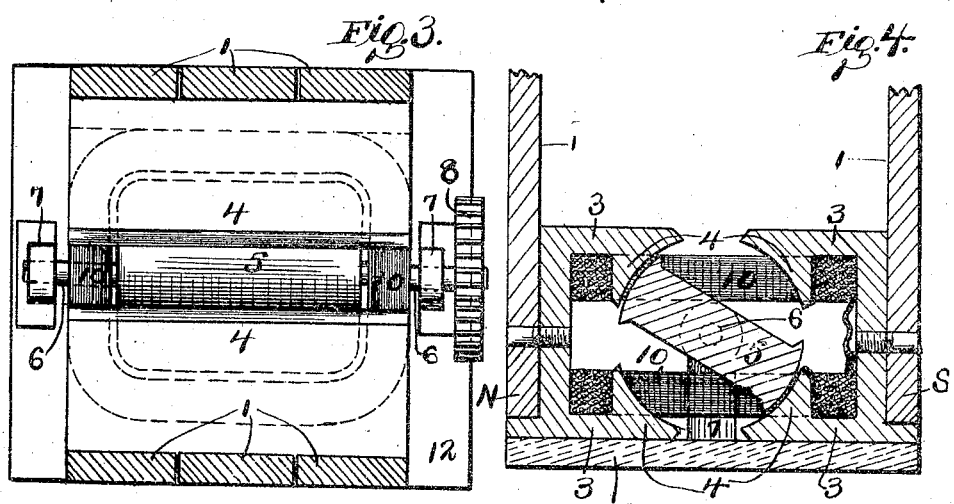

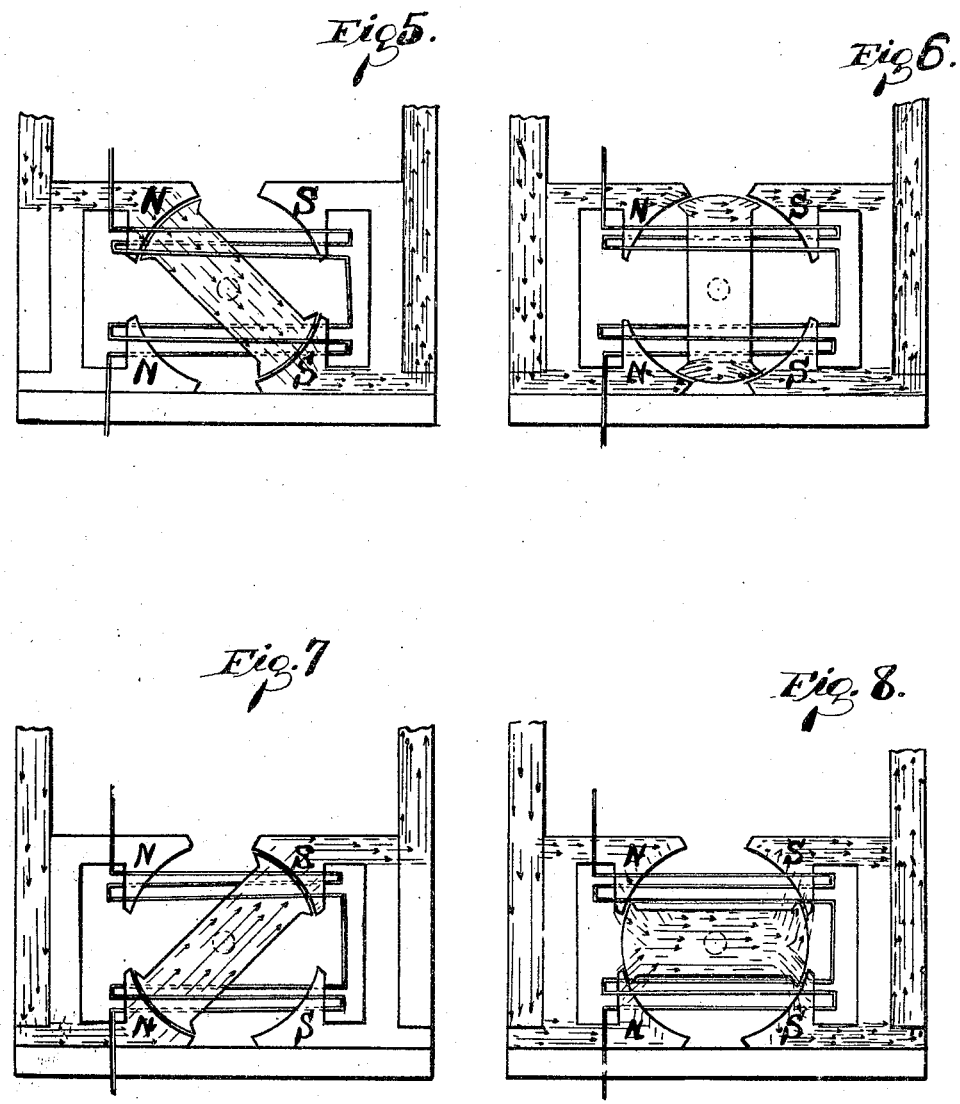

CHARLES C. RUPRECHT, OF CLEVELAND, OHIO, ASSIGNOR, BY MESNE ASSIGNMENTS, TO RUPRECHT ELECTRICAL COMPANY, OF CLEVELAND, OHIO, A COPARTNERSHIP.

ELECTRIC-CURRENT GENERATOR.

No. 914,311.  Specification of Letters Patent.  Patented March 2, 1909.

Application filed July 28, 1905. Serial No. 271,679.

*To all whom it may concern:*

Be it known that I, CHARLES C. RUPRECHT, a citizen of the United States of America, residing at Cleveland, in the county of Cuyahoga and State of Ohio, have invented certain new and useful Improvements in Electric-Current Generators; and I hereby declare the following to be a full, clear, and exact description of the invention, such as will enable others skilled in the art to which it pertains to make and use the same.

This invention relates to apparatus for the production of alternating currents of electricity, and has for its objects to provide a generator of this type of great efficiency, simplicity of construction, and with a minimum number of movable parts, and that will greatly reduce hysteresis and self-induction and the losses incidental thereto while maintaining and even building up the magnetic strength of the field.

The apparatus whereby the above results are accomplished comprises a bi-polar generator with a fixed winding or coil and an inductor or rotor in inductive relation to said winding or coil, whereby it is possible to revolve the rotor or inductor at any desired rate of speed and to produce at least four alternations for each complete revolution of the rotor or inductor without any tendency to loosen or otherwise detrimentally affect the winding or coil, and without the necessity of employing a governor to keep the speed of the inductor within prescribed limits.

My invention also consists in the features of construction and combinations of parts as described in the specification, pointed out in the claims and illustrated in the accompanying drawings.

In the accompanying drawings Figure 1 is a view in side elevation of a generator embodying my invention. Fig. 2 is a view in end elevation of same. Fig. 3 is a section on line 3—3, Fig. 1. Fig. 4 is a section on line 4—4, Fig. 1. Figs. 5 to 8 inclusive illustrate four positions of the inductor and the disposition of magnetic flux during a half revolution of the inductor.

Again referring to the drawings, 1 represents a permanent horseshoe magnet, the north and south poles of which are indicated by N and S. To each of the poles of the said magnet is secured a bifurcated or forked pole piece comprising a metallic plate 2 which is provided with arms 3 and at the end of the arms are arranged head pieces 4 having portions 4ª projecting toward each other. One face of each of the said heads is preferably arranged parallel with the plate 2 and the other face is curved corresponding to an arc of a circle slightly greater than the circle described by the revolution of the inductor. As soon as the forked pole pieces are secured to the respective pole pieces of the permanent magnet, each forked pole piece becomes magnetized similarly to the pole to which it is secured, and there are then at each end of the permanent magnet a pair of poles, the poles in each pair having the same magnetism.

An inductor or rotor 5, preferably of laminated iron, is mounted on a shaft 6 which is supported in bearings 7 and on the end of the shaft 6 is arranged a gear wheel 8 by means of which the shaft 6 can be driven as desired. An armature consisting of a coil or winding 10 is arranged partly within the pole pieces so as to be in inductive relation to the rotor or inductor 5. In the construction shown herein, the coil encircles the portions 4ª of the head pieces 4 and the rotor or inductor 5. The coil 10 is, preferably, arranged so as not to come in contact with the shaft 6, and the ends of the coil are left free so that they may be connected in any suitable manner to the terminals of the circuit through which the current generated is to flow. The generator is, preferably, mounted on any suitable base 12.

When the inductor is rotated or oscillated a change is brought about in the direction and also a variation in the strength of the magnetic flux produced by the magnetic circuit passing into and through the inductor, the magnetic flux either cutting or flowing parallel with the coil 10. The variation in strength of the magnetic flux and the change in direction thereof, whereby it cuts or ceases to cut the coils produce an alternating potential or voltage in the coils, which in turn causes an alternating current to flow. With especial reference to Figs. 5 to 8 it will be seen that when the inductor is lying between dissimilar poles, that is between diametrically opposite poles, the magnetic flux (indicated by the arrows) will flow from one pole to the other pole through the inductor and will therefore thread or cut the coil 10, thereby inducing a current in said coil.

When the inductor assumes a vertical position midway between the poles the magnetic flux will flow from one pair of similar poles to the other pair of similar poles through the ends of the inductor and parallel with the coil and there will be no current effect produced by the coil, the position of the parts at this time corresponding to the node of the current wave. When the inductor is turned so that it again lies between diametrically opposite poles the magnetic flux will again flow through the inductor but in the opposite direction and a current will be induced in the coil which will flow through the coil in the opposite direction to that in which the current first passed through the coil. When the inductor assumes a horizontal position the magnetic flux will again flow parallel with the coil and no current effect will be produced therein for the reasons given above. Therefore as the generator illustrated herein has four poles there will be four alternations of currents produced during every rotation of the inductor.

It will be noted that in the construction illustrated herein the coil not only surrounds the flux-carrying portions of the inductor but has its axis at right angles with respect to the axis of the inductor. With this arrangement of parts, it follows that, when the inductor is in either of the positions shown in Figs. 5 and 7, the current generated in the coil by the magnetic flux through the inductor builds up the magnetism of the pole pieces which are not bridged by the inductor, with a comparatively slight weakening of the magnetism of the pole pieces which are bridged by the inductor. The net result is to build up and maintain the magnetism of the field. Meanwhile, it will be apparent that, owing to the rotation of the inductor, and the arrangement of the same relative to the pole pieces and the coil or winding there will be but two reversals of magnetic flux through the inductor for each rotation thereof and that the magnetic flux through the inductor will occur twice in the same direction before there is a reversal, whereby the resistance to the passage of the magnetic flux through the inductor is much less than would be the case were the flux through the inductor reversed every time said inductor bridges diametrically opposite pole-pieces. This greatly reduces the loss by hysteresis, and the net effect, both as to the current generated within the winding 10 and the building up and maintaining of the magnetism of the field, will be greatly increased over that obtained by reversing the magnetic flux through the inductor consecutively with such reversal through the armature or winding.

It will be readily seen that, with my construction no brushes or moving contacts are necessary, which not only makes it possible to simplify the construction of the generator but also makes the generator available for many uses for which other forms of generators are impracticable. The cutting down of the frequency of flux-reversal in the inductor and the position of the winding in the permanent field reduce self-induction and the losses incident thereto.

What I claim is:—

1. In an alternating current generator, the combination of a permanent magnet having each end thereof provided with a forked pole piece, the pole pieces which are of similar magnetism being arranged consecutively in an arc of a circle and so that each pole has a pole of dissimilar magnetism opposite to it, a rotary inductor extending between said pole pieces and at an angle to the planes thereof, a fixed winding in the recesses of the forked pole-pieces, and means for continuously rotating said inductor, the parts being arranged to augment the magnetism of the field of the permanent magnet by the current generated in said winding, substantially as specified.

2. In an alternating current generator, the combination of a permanent magnet having each end thereof provided with a plurality of pole pieces, the pole pieces which are of similar magnetism being arranged consecutively in an arc of a circle and so that each pole has a pole of dissimilar magnetism opposite to it, a rotary inductor extending between said pole pieces and at an angle to the planes thereof, means for rotating said inductor, and a fixed winding in the recesses between the pole pieces and extending entirely around the flux-carrying portions of the inductor, substantially as specified.

3. In an alternating current generator, the combination of a permanent magnet having each end thereof provided with a pair of poles projecting therefrom, the poles of each pair having a portion projecting toward the other, a winding surrounding the projecting portions of the poles, and a rotary inductor within said winding and arranged in inductive relation to said winding and to said poles, substantially as specified.

4. In an alternating current generator, the combination of a permanent magnet having each end thereof provided with a pair of poles projecting therefrom, the poles of each pair each having a portion projecting toward the other, a winding surrounding the projecting portions of the poles, and a rotary inductor within said winding and arranged in inductive relation to said winding and to said poles with its axis at an angle to the planes of said poles and to the axis of said winding, substantially as specified.

5. In an alternating current generator, the combination of a plurality of magnetic poles, the poles of similar magnetism being arranged consecutively in an arc of a circle and so that each pole has opposite to it a pole of dissimilar magnetism, the poles of like magnetism having portions projecting toward each other, a winding surrounding such projecting portions of said poles, and a rotary inductor entirely within said winding and arranged in inductive relation to said winding and said poles, substantially as specified.

In testimony whereof, I sign the foregoing specification, in the presence of two witnesses.

CHARLES C. RUPRECHT.

Witnesses:
 VICTOR C. LYNCH,
 N. L. McDONNELL.